United States Patent
Huan

(10) Patent No.: US 8,242,923 B2
(45) Date of Patent: Aug. 14, 2012

(54) ELECTRONIC DEVICE WITH AN ALERT BASED ON ACCELERATION DERIVED FROM GPS

(75) Inventor: Tar-Koon Huan, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 460 days.

(21) Appl. No.: 12/490,651

(22) Filed: Jun. 24, 2009

(65) Prior Publication Data

US 2010/0265081 A1 Oct. 21, 2010

(30) Foreign Application Priority Data

Apr. 16, 2009 (CN) .......................... 2009 1 0301592

(51) Int. Cl.
*G08B 21/00* (2006.01)
(52) U.S. Cl. ................. 340/669; 340/573.1; 340/573.7; 600/301

(58) Field of Classification Search ................. 340/669, 340/573.1, 573.7; 600/301
See application file for complete search history.

(56) References Cited

U.S. PATENT DOCUMENTS

2007/0109133 A1* 5/2007 Kister et al. ............... 340/573.1
2009/0315719 A1* 12/2009 Song et al. ................. 340/573.1

* cited by examiner

*Primary Examiner* — Jennifer Mehmood
*Assistant Examiner* — Hongmin Fan
(74) *Attorney, Agent, or Firm* — Altis Law Group, Inc.

(57) ABSTRACT

An electronic device with an alert system is disclosed. The electronic device includes a global positioning system (GPS) module and a central processing unit (CPU). The GPS module is capable of determining two velocities on two locations. The CPU is capable of computing a rate of change in velocity derived by dividing a change in velocity between the two locations into the time elapsed between the two locations. The CPU sends an alert message when the rate of change in velocity is beyond a preset value.

8 Claims, 2 Drawing Sheets

ELECTRONIC DEVICE WITH AN ALERT BASED ON ACCELERATION DERIVED FROM GPS

BACKGROUND

1. Technical Field

The present disclosure relates to an electronic device and, particularly, to an electronic device with an alert system.

2. Description of Related Art

The Global Positioning System (GPS) consists of 24 earth-orbiting satellites. The GPS satellites broadcast a navigation message via a radio frequency (RF) signal. This signal allows any individual with a GPS receiver to process the GPS signals and determine his or her precise longitude, latitude, altitude, velocity and time anywhere in the world.

Current GPS receiver does not have other functions when some abnormal situation occurred during using the GPS receiver. It is not convenient for users to use the GPS receiver.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
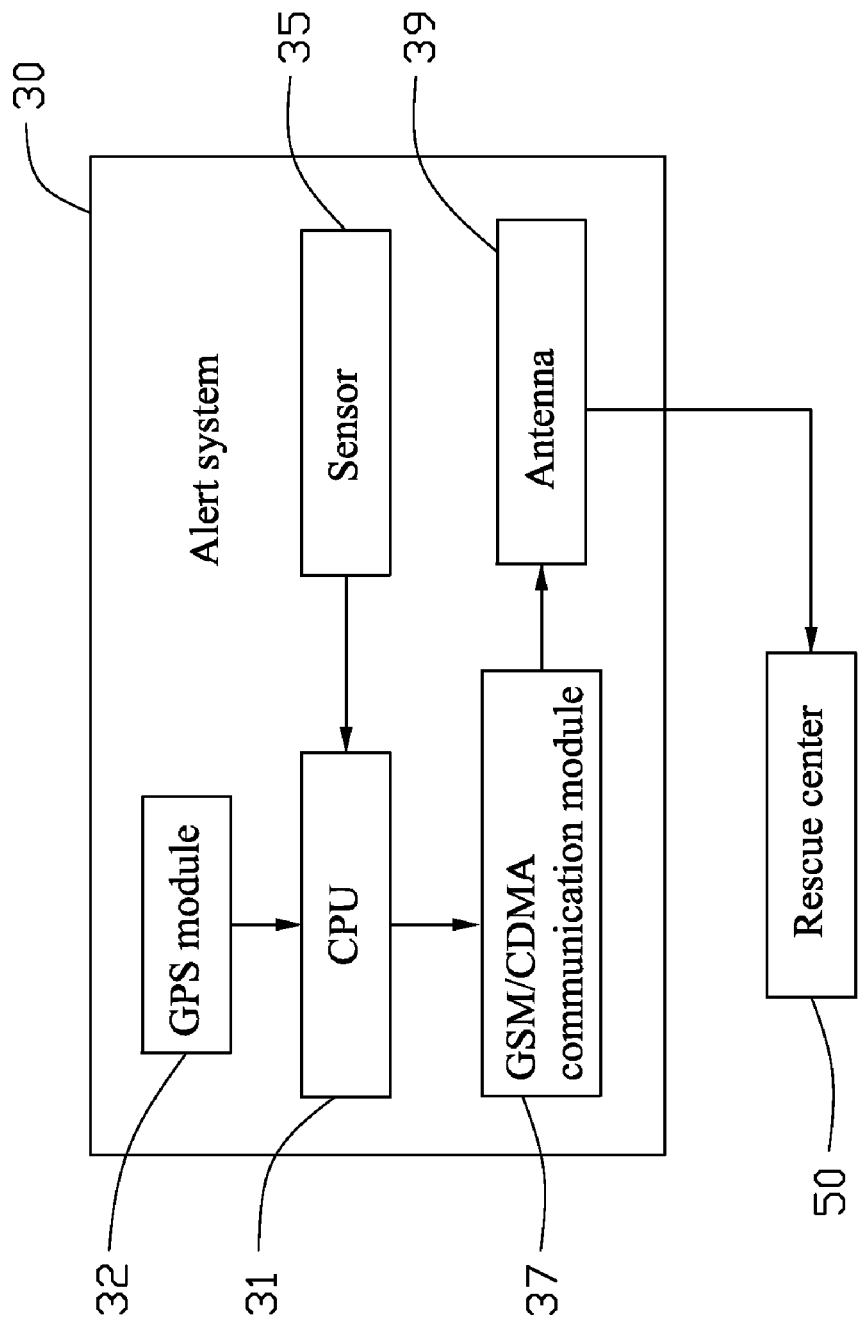
FIG. 1 is a block view of an electronic device.

Referring to FIG. 1, an electronic device with an alert system 30 includes a central processing unit (CPU) 31, a global positioning system (GPS) module 32, a sensor 35, a communication module 37 and an antenna 39. The communication module 37 includes a Global System for Mobile (GSM) communication module and a Code Division Multiple Access (CDMA) communication module. The CPU 31 presets a rate of change in velocity and a rate of change in vibration. The CPU 31 is capable of receiving and processing information from the GPS module 32 and the sensor 35, and then sending the processing result to the GSM/CDMA communication module 37.

The sensor 35 detects a rate of change in vibration of the alert system 30 and transfers the rate of change in vibration to the CPU 31. The GSM/CDMA communication module 37 transmits information to the antenna 39. The antenna 39 can transmit information from the GSM/CDMA communication module 31 to a rescue center 50.

The GPS module 32 receives National Marine Electronics Association (NMEA) information. The NMEA information includes a location of the alert system 30, velocity, time, and so on. The GPS module 32 transmits the NMEA information to the CPU 31. The CPU 31 computes a rate of change in velocity at a set interval according to the NEMA information. The rate of change in velocity is derived by dividing a change in velocity between two locations into the time elapsed between the two locations. If the rate of change in velocity is beyond the preset rate of change in velocity in the CPU 31, the CPU 31 sends the alert message to the GSM/CDMA communication module 37. If not, the CPU 31 does not send the alert message. The alert system 30 may include an accelerometer to detect a rate of change in velocity.

The sensor 35 detects a rate of change in vibration of the alert system 30 and transfers the rate of change in vibration to the CPU 31. If the rate of change in vibration is beyond the preset rate of change in vibration in the CPU 31, the CPU 31 sends the alert message to the GSM/CDMA communication module 37. If not, the CPU 31 does not send the alert message. The GSM/CDMA communication module 37 sends the alert message to the rescue center 50 via the antenna 39.

Figure 2:
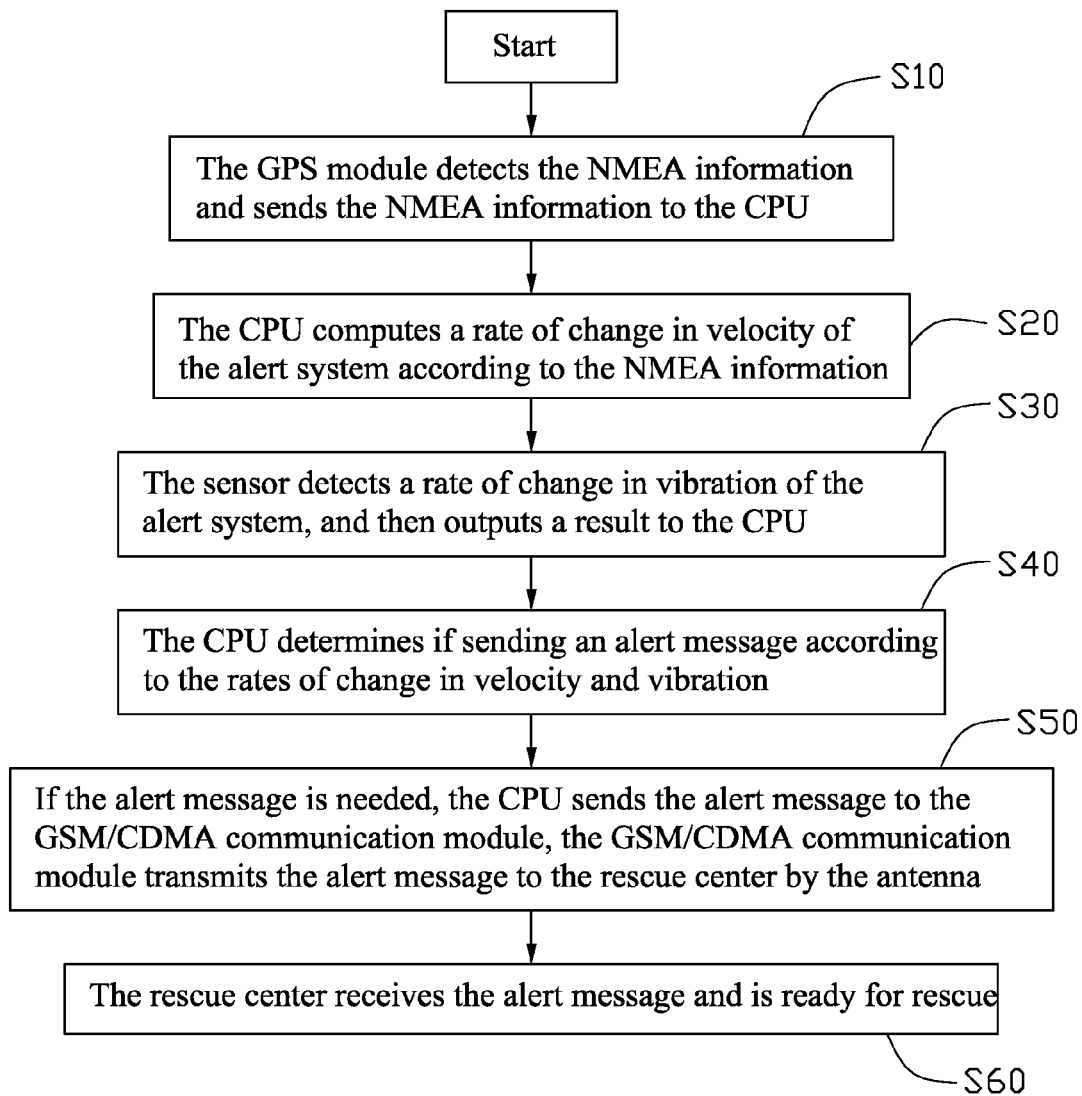
FIG. 2 is a flowchart of the operation of the electronic device.

Referring to FIG. 2, a flowchart of the alert system 30 is disclosed.

S10: the GPS module 32 detects the NMEA information, such as a location of the alert system 30 at a set interval, and sends the NMEA information to the CPU 31.

S20: the CPU 31 computes a rate of change in velocity of the alert system 30 according to the NMEA information.

S30: the sensor 35 detects a rate of change in vibration of the alert system 30, and then outputs the rate of change in vibration to the CPU 31.

S40: the CPU 31 determines whether to send an alert message according to the rates of change in velocity and/or vibration.

S50: if the alert message is needed, the CPU 31 sends the alert message to the GSM/CDMA communication module 37. The GSM/CDMA communication module 37 transmits the alert message to the rescue center 50 by the antenna 39. The alert message includes current location information of the alert system 30.

S60: the rescue center 50 receives the alert message.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device with an alert system, comprising:

a global positioning system (GPS) module for determining two velocities on two locations;

a central processing unit (CPU), wherein the CPU computes a rate of change in velocity derived by dividing a change in velocity between the two locations into the time elapsed between the two locations, and the CPU sends an alert message when the rate of change in velocity is above a preset velocity value; and a sensor, the sensor detects a rate of change in vibration between the two locations, and the CPU sends the alert message when the rate of change in vibration is above a preset vibration value.

2. The electronic device of claim 1, further comprising a Global System for Mobile (GSM) communication module, and the CPU is connected to the GSM communication module to send the alert message.

3. The electronic device of claim 1, further comprising a Code Division Multiple Access (CDMA) communication module, and the CPU is connected to the CDMA communication module to send the alert message.

4. The electronic device of claim 1, wherein the alert message comprises a current location information.

5. A method of sending alert message, comprising:
acquiring a first velocity and a second velocity at different times by a global positioning system (GPS) module;
computing a rate of change in velocity derived by dividing a change in velocity between the first and second velocities into the time elapsed between the first and second velocity via a central processing unit (CPU);
detecting a rate of change in vibration through a sensor; and outputting the rate of change in vibration to the CPU; and
sending an alert message when the rate of change in velocity is above a preset velocity value, or the rate of change in vibration is above a preset vibration value.

6. The method of claim 5, wherein the alert message is sent by a Global System for Mobile (GSM) communication module communicating with the CPU.

7. The method of claim 5, wherein the alert message is sent by a Code Division Multiple Access (CDMA) communication module communicating with the CPU.

8. The method of claim 5, wherein the alert message comprises a current location information.

* * * * *